United States Patent
Nuttall et al.

(10) Patent No.: US 11,849,867 B2
(45) Date of Patent: Dec. 26, 2023

(54) ENERGY SAVING FOOD DISPLAY CABINET

(71) Applicant: The Alan Nuttall Partnership Limited, Hinckley (GB)

(72) Inventors: Alan Nuttall, Copston Magna (GB); Michael James Steele, Sapcote (GB)

(73) Assignee: The Alan Nuttall Partnership Limited, Leicestershire (GB)

(*) Notice: Subject to any disclaimer, the term of this patent is extended or adjusted under 35 U.S.C. 154(b) by 766 days.

(21) Appl. No.: 15/022,138

(22) PCT Filed: Aug. 28, 2014

(86) PCT No.: PCT/GB2014/052600
§ 371 (c)(1),
(2) Date: Mar. 15, 2016

(87) PCT Pub. No.: WO2015/044637
PCT Pub. Date: Apr. 2, 2015

(65) Prior Publication Data
US 2016/0235218 A1    Aug. 18, 2016

(30) Foreign Application Priority Data
Sep. 24, 2013 (GB) ..................................... 1316911

(51) Int. Cl.
*A47F 3/00* (2006.01)
*A47F 3/04* (2006.01)
(Continued)

(52) U.S. Cl.
CPC ............ *A47F 3/0478* (2013.01); *A47F 3/001* (2013.01); *A47F 10/02* (2013.01); *G05B 15/02* (2013.01)

(58) Field of Classification Search
CPC ........ A47F 10/02; A47F 3/001; A47F 3/0478; A47F 3/0482; G05B 15/02; A47J 10/02;
(Continued)

(56) References Cited

U.S. PATENT DOCUMENTS 2,994,760 A    8/1961    Pecoraro et al.
3,147,602 A    9/1964    Beckwith
(Continued)

FOREIGN PATENT DOCUMENTS

GB          1000343        8/1965
WO       2003099077 A1    12/2003
(Continued)

OTHER PUBLICATIONS

Final Office Action dated Oct. 28, 2016, in related U.S. Appl. No. 15/087,097, filed Mar. 31, 2016.
(Continued)

*Primary Examiner* — Ericson M Lachica
(74) *Attorney, Agent, or Firm* — Downs Rachlin Martin PLLC

(57) ABSTRACT

A food display cabinet having a plurality of food display zones, wherein each food display zone including a heat exchange element and is configurable to be held at the same or different temperatures, the food display cabinet having a control logic to control the temperature of each of the food display zones, the control logic configured to: receive an indicia of an item to be placed in a first food display zone, and the time in which the item is placed in the zone; identify a temperature and power profile associated with the item; vary the temperature of the first food display zone, using the heat exchange element, so that the first food display zone is at the identified temperature at the time the item is placed in the first food display zone.

31 Claims, 4 Drawing Sheets

(51) Int. Cl.
 *G05B 15/00* (2006.01)
 *A47F 10/02* (2006.01)
 *G05B 15/02* (2006.01)

(58) Field of Classification Search
 CPC .. F25B 29/00; H05B 1/02; H05B 6/06; H06B 6/68
 See application file for complete search history.

(56) References Cited

U.S. PATENT DOCUMENTS

| | | | |
|---|---|---|---|
| 3,304,740 A | 2/1967 | Dickson et al. | |
| 3,632,968 A | 1/1972 | Wilson | |
| 4,019,339 A | 4/1977 | Anderson | |
| 4,254,824 A * | 3/1981 | Springer | F25D 31/005 165/64 |
| 4,283,614 A | 8/1981 | Tanaka et al. | |
| 4,381,442 A | 4/1983 | Guibert | |
| 4,395,233 A | 7/1983 | Smith et al. | |
| 4,455,478 A | 6/1984 | Guibert | |
| 4,506,143 A * | 3/1985 | Telis | G05D 23/20 219/490 |
| 5,086,693 A | 2/1992 | Tippman et al. | |
| 5,188,020 A * | 2/1993 | Buchnag | B65B 69/00 186/55 |
| 5,203,255 A * | 4/1993 | Wells | A47F 3/001 99/468 |
| 5,404,935 A * | 4/1995 | Liebermann | A21B 1/10 165/48.1 |
| 5,454,427 A * | 10/1995 | Westbrooks, Jr. | A23L 3/365 165/267 |
| 5,501,076 A | 3/1996 | Sharp, III et al. | |
| 5,532,456 A | 7/1996 | Smith et al. | |
| 5,558,010 A | 9/1996 | Shelton | |
| 5,618,458 A | 4/1997 | Thomas | |
| 5,724,886 A * | 3/1998 | Ewald | A47F 10/06 99/374 |
| 5,747,775 A | 5/1998 | Tsukamoto et al. | |
| 6,011,243 A * | 1/2000 | Arnold | G07F 9/02 219/214 |
| 6,073,547 A | 6/2000 | Westbrooks, Jr. et al. | |
| 6,102,162 A * | 8/2000 | Teicher | G07F 17/0042 186/39 |
| 6,111,224 A | 8/2000 | Witt | |
| 6,315,039 B1 * | 11/2001 | Westbrooks, Jr. | A47J 39/006 165/201 |
| 6,384,380 B1 | 5/2002 | Faries, Jr. et al. | |
| 6,619,814 B1 | 9/2003 | Tamada et al. | |
| 6,658,994 B1 * | 12/2003 | McMillan | A23L 3/3418 219/214 |
| 6,742,344 B2 | 6/2004 | Vormedal | |
| 6,774,345 B1 * | 8/2004 | Kenk | A21B 1/26 219/494 |
| 7,129,447 B1 | 10/2006 | Kim et al. | |
| 7,829,823 B2 | 11/2010 | Nuttall et al. | |
| 7,905,173 B2 | 3/2011 | Sus et al. | |
| 8,468,836 B2 | 6/2013 | Tuskiewicz et al. | |
| 8,729,429 B2 | 5/2014 | Nuttall et al. | |
| 2002/0005686 A1 | 1/2002 | Nuttall et al. | |
| 2002/0060215 A1 | 5/2002 | Allera et al. | |
| 2002/0121095 A1 | 9/2002 | Adamski et al. | |
| 2002/0163436 A1 * | 11/2002 | Singh | F25B 49/005 340/584 |
| 2003/0040967 A1 * | 2/2003 | Miyazaki | G06Q 20/20 705/15 |
| 2003/0047553 A1 * | 3/2003 | Patti | F24C 7/082 219/400 |
| 2003/0052116 A1 * | 3/2003 | Hohler | A47J 36/2483 219/400 |
| 2003/0154733 A1 | 8/2003 | Ruiz et al. | |
| 2003/0233841 A1 | 12/2003 | Yingst | |
| 2004/0020915 A1 * | 2/2004 | Shei | A47J 39/006 219/385 |
| 2004/0177634 A1 | 9/2004 | Yamazaki et al. | |
| 2004/0226932 A1 | 11/2004 | Flinn | |
| 2005/0076662 A1 | 4/2005 | Roche et al. | |
| 2005/0217297 A1 | 10/2005 | Wilson | |
| 2006/0059934 A1 | 3/2006 | Howington et al. | |
| 2006/0118542 A1 | 6/2006 | Oh et al. | |
| 2006/0185527 A1 * | 8/2006 | Shei | F24C 7/087 99/467 |
| 2007/0138167 A1 * | 6/2007 | Friedman | A47F 3/001 219/544 |
| 2007/0144202 A1 * | 6/2007 | Theodos | F24C 15/18 62/348 |
| 2007/0213864 A1 * | 9/2007 | Iijima | G05B 19/41865 700/121 |
| 2007/0254079 A1 * | 11/2007 | Sus | F24C 15/166 426/523 |
| 2008/0098907 A1 | 5/2008 | Peters et al. | |
| 2008/0142502 A1 * | 6/2008 | Bratcher | H05B 3/68 219/450.1 |
| 2008/0213449 A1 * | 9/2008 | Wisner | A47J 39/006 426/520 |
| 2008/0245783 A1 | 10/2008 | Aoyama et al. | |
| 2008/0283440 A1 * | 11/2008 | Hartsfield, Jr. | F25D 31/005 206/557 |
| 2008/0284296 A1 * | 11/2008 | Nuttall | A47J 39/006 312/236 |
| 2009/0056558 A1 | 3/2009 | Cretors et al. | |
| 2010/0059498 A1 | 3/2010 | Hansen et al. | |
| 2010/0115969 A1 * | 5/2010 | Tuszkiewicz | A47F 3/0404 62/3.3 |
| 2010/0140251 A1 * | 6/2010 | Shei | A47J 27/004 219/439 |
| 2010/0313588 A1 * | 12/2010 | Swofford | A47F 3/0443 62/251 |
| 2011/0030565 A1 * | 2/2011 | Shei | F25D 31/005 99/329 P |
| 2011/0049119 A1 | 3/2011 | Nuttall et al. | |
| 2011/0083564 A1 * | 4/2011 | Kirby | A47J 39/006 99/468 |
| 2011/0114625 A1 | 5/2011 | Chung et al. | |
| 2011/0147362 A1 * | 6/2011 | Van Dorst | A47F 3/001 219/218 |
| 2011/0252813 A1 * | 10/2011 | Veltrop | A47J 39/006 62/3.3 |
| 2011/0253703 A1 * | 10/2011 | Theodos | H05B 1/02 219/492 |
| 2012/0064197 A1 * | 3/2012 | Kennedy | A45C 11/20 426/87 |
| 2012/0216987 A1 * | 8/2012 | Hartsfield, Jr. | H05B 3/68 165/63 |
| 2012/0245732 A1 * | 9/2012 | Yoakim | G07F 9/026 700/244 |
| 2012/0248088 A1 * | 10/2012 | McMahon | A47J 39/006 219/387 |
| 2012/0285942 A1 * | 11/2012 | Godecker | F25B 21/02 219/201 |
| 2013/0132214 A1 * | 5/2013 | Hulett | G06Q 30/00 705/15 |
| 2014/0165644 A1 * | 6/2014 | Veltrop | F25D 23/003 62/440 |
| 2014/0292168 A1 | 10/2014 | Nevarez | |
| 2015/0230631 A1 * | 8/2015 | Nuttall | A47J 36/24 312/400 |
| 2016/0195287 A1 * | 7/2016 | Shirali | A47J 39/003 700/282 |

FOREIGN PATENT DOCUMENTS

| | | | | |
|---|---|---|---|---|
| WO | | 2004005819 A2 | 1/2004 | |
| WO | | 2006111767 A1 | 10/2006 | |
| WO | WO-2007053002 A1 * | | 5/2007 | ........... A47F 3/0447 |

OTHER PUBLICATIONS

International Preliminary Report on Patentability dated Sep. 7, 2015, in connection with PCT/GB2014/052600, filed Aug. 28, 2014.

(56) References Cited

OTHER PUBLICATIONS

International Search Report and Written Opinion dated Oct. 21, 2014, in connection with PCT/GB2014/052600, filed Aug. 28, 2014.
Notice of Allowance dated Aug. 22, 2016, in related U.S. Appl. No. 14/419,949, filed Feb. 6, 2015.

* cited by examiner

ENERGY SAVING FOOD DISPLAY CABINET

TECHNICAL FIELD

The invention relates to a method of optimising the energy consumed by a food display cabinet, in particular food display cabinets in which food is placed in a retail environment for display to end users.

BACKGROUND TO THE INVENTION

In food retail environments food must held in food display units/cabinets at temperatures appropriate to the food contained within the unit. Accordingly, hot foods, or drinks, are held at elevated temperatures (typically around 50° C. to 80° C. depending on the foodstuff), other products may be held at ambient temperature (typically around 20° C.) or chilled (typically around 5° C.) or frozen (typically around −20° C.). Such cabinets are therefore extensively used by the end user e.g. a customer in a supermarket, and therefore are designed to be used without specialist training. Such food display units are known in retail environments, such as shops, supermarkets, cafes etc, for the presentation of foodstuffs for a consumer to purchase.

In a food retail environment multiple food display cabinets are typically required, with each unit being held at a constant temperature. A cabinet/unit may be defined as having a number of shelves on which produce in placed, and the temperature across the entire unit is kept constant. Therefore if a retailer were to sell items at different temperatures multiple units are typically required, each unit being held at a different temperature. Such units can only perform a single function generally within the unit's interior that creates a single temperature across the entire food display unit.

The temperature of a given food display cabinet or unit typically remains constant during the day. Where the unit is heated, or chilled, the average power consumption of a unit may be of the order of 3 kW/hr. Over the course of a year due to the level of energy consumption, a significant amount of energy is consumed. Whilst improvements have been made in the efficiencies of such food display units, the amount of energy utilised (and accordingly the cost of running such units) remains significant.

According to an aspect of the invention there is provided a food display cabinet having a plurality of food display zones, wherein each food display zone includes a temperature regulating device and is configurable to be held at the same or different temperatures, the food display cabinet having a controller to control the temperature of each of the food display zones, the controller configured to: receive indicia of an item to be placed in a first food display zone; identify a temperature profile associated with the item; vary the temperature of the first food display zone, using the heat exchange element, so that the first food display zone is at the identified temperature for the item.

There is also provided a method of operating a food display cabinet having a plurality of food display zones, wherein each food display zone includes a temperature regulating device and is configurable to be held at the same or different temperatures, the food display cabinet having a controller to control the temperature of each of the food display zones, the method comprising the steps of: receiving indicia of an item to be placed in a first food display zone; identifying, based on the received indicia, a temperature profile associated with the item; varying the temperature of the first food display zone, using the heat exchange element, so that the first food display zone is at the identified temperature for the item.

Therefore the present invention ensures that the temperature of the food display zone is optimised during the course of the day to the appropriate temperature for the food to be stored in food display zone. As well as reducing the energy consumed, the present invention allows for fewer display units to be used in a store. By allowing the temperature of each zone to be changed during the course of a day the invention allows for foodstuffs of differing temperatures to be displayed in the same unit during the course of day. Such an arrangement is found to lead to significant energy savings over the lifetime of the food display unit.

Other aspects of the invention will be apparent from the appended claim set.

BRIEF DESCRIPTION OF THE DRAWINGS

Embodiments of the invention are now described, by way of example only, with reference to the accompanying drawing in which.

DETAILED DESCRIPTION OF AN EMBODIMENT

According to an aspect of the invention there is provided multi-zone food display cabinet which optimises its energy consumption over the course of the day.

In an embodiment of the invention the multi-zone food display unit is a FlexeServe-Zone cabinet as sold by Alan Nuttall Limited and as described in GB patent GB 1316909.9 filed in the name of Alan Nuttall Limited.

Such cabinets comprise several separate and thermally discreet zones (four in this embodiment) in which food is held and displayed to the end user, such as a customer in a cafe or supermarket. Each zone is thermally insulated from the other zones and the temperature of each zone may be controlled independently of the other. Such a configuration allows for different foods to be kept at different temperatures within the same unit. For example a unit may contain a mixture of chilled and ambient foods in different zones. Therefore the owner of a retail unit would only require a single cabinet to store food items at different temperatures whereas previously they would have required two or more cabinets.

Figure 1:
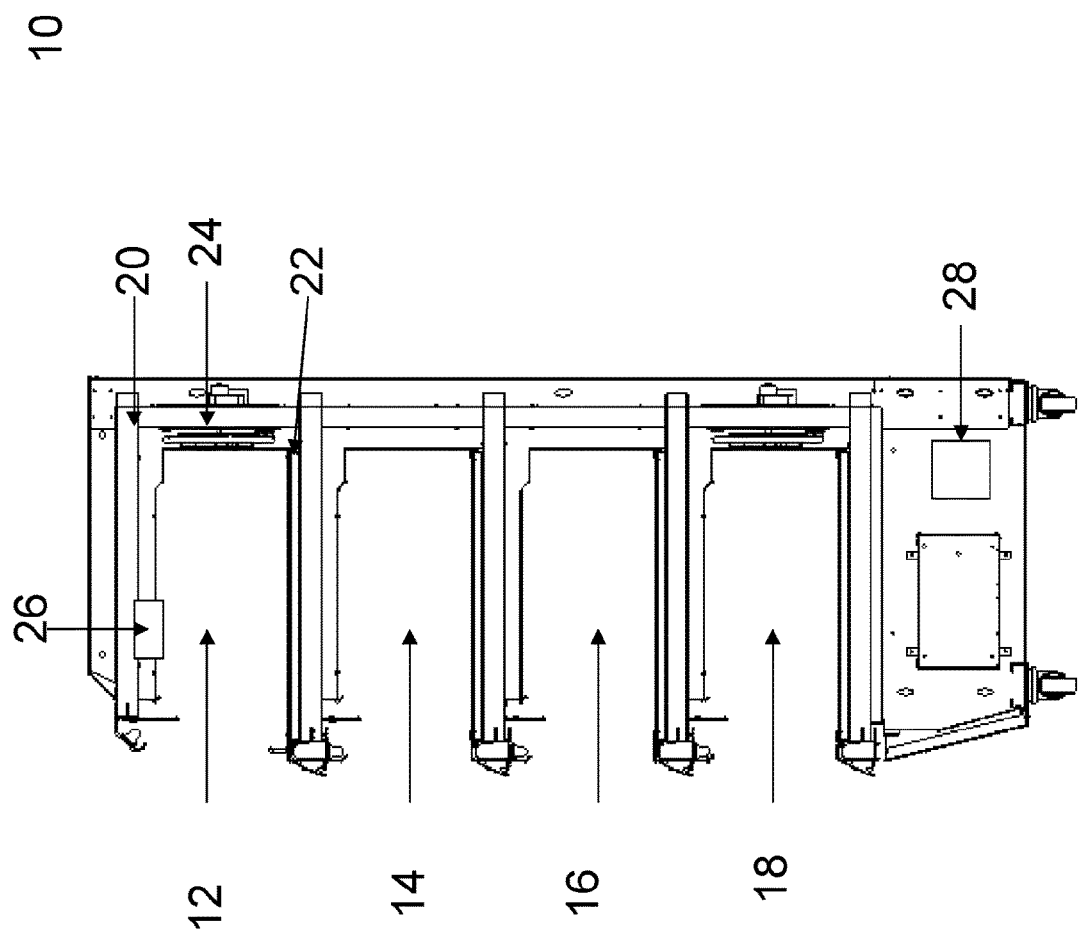
FIG. 1 is a schematic of the apparatus according to an aspect of the invention.

FIG. 1 shows a schematic representation of a food display cabinet in accordance with an embodiment of the invention.

There is shown the food display unit (or cabinet) 10, the food display cabinet comprising multiple food display zones. There is shown the first zone 12, second zone 14, third zone 16 and a fourth zone 18.

Each zone is thermally insulated from the other zones, and comprises a top panel 20, base panel 22, temperature regulating device 24 and a temperature sensor 26. The individual zones are controlled by a controller 28 which is preferably integrated within the food display unit 10. As such, the cabinets are used for the display of food, in a preferred embodiment the unit is an open fronted cabinet which allows the end user easy access to the products being displayed. Such food display cabinets therefore do not cook the food placed in the zones. Rather they are used in retail environments to present produce to the consumer.

In the embodiment shown in FIG. 1, the food display unit 10 comprises four food display zones though in further embodiments the number of food display zones may vary. Preferably, the food display zones are stacked vertically on top of each other such that when in use in a retail environment, each zone is easily accessible by a user without the user having to move from their initial position.

The top panel 20 of each zone is preferably insulated in order to prevent thermal leakage between one or more of the food display zones. The top panel 20 may also have integrated thereon lights, and panels for indicating pricing information and/or branding or the like.

The base panel 22, preferably is also insulated in order to prevent thermal leakage between the individual food display zones. Each food display zone (12, 14, 16 and 18) has an individual temperature regulating device 24.

In a preferred embodiment the temperature regulating device 24 comprises the use of a thermocouple sensor that is preferably mounted onto the underside surface of the base cover material 22 which is connected to an electronic controller 28 which responds to variations in set temperatures to turn on or off heating or cooling means within the constraints of that specific food display zone. Set onto the underside of base surface 22 is a resistive heater means that is overlaid with a surface material that is preferably a glass or ceramic glass. The temperature regulating device on the rear panel 24 is by heater means that is accompanied with a radial fan(s) to distribute hot air into the specific food display zone by way of a ducted chamber running under the top of the zone and distributed as an air curtain over the front aperture of the specific zone to be recaptured back into the specific zone for recycling over the heater element(s).

Preferably, the base heater and the rear heater means are independent and can be used simultaneously or separately to provide heating means for the specific food display zone. For the cooling of a specific food display zone, the heater elements in an embodiment would be replaced by a cooling coil preferably a vapour evaporation device or some other form of heat exchange device configured to cool the specific food display zone. The base material 22 is preferably glass or ceramic glass with the thermocouple sensor on the under surface.

Dependant on the envisaged usage of the food display cabinet 10 the temperature regulating device 24 may be selected so as to maintain the contents of the individual food display zones within a desired temperature range. For example, in embodiments in which the food display unit is envisaged to mostly hold warm or hot food items (which according to Food Safety Regulations require the zone to be held at a temperature of 70° C. or above) then the temperature regulating device 24 need not contain a refrigeration device as such a component would be redundant. In further embodiments the temperature regulating device 24 may contain both refrigerating and heating elements. Preferably, the temperature regulating device 24 comprises a plurality of fans in order to circulate the air contained in the volume space defined by each of the food display zones.

In further embodiments the food display cabinet is a modular unit in which individual modules may be combined to define a food display unit having multiple food display zones. Accordingly the term food display unit may refer to a singular unit or a modular unit in which the modules are combined to define the food display unit.

The structure of such a food display unit in a preferred embodiment of the invention is described in detail in GB patent application GB 1316909.9 in the name of Alan Nuttall Limited. The contents of which are hereby incorporated by reference.

In use, the food display unit therefore allows for the display of multiple different food items to be held at different temperatures within the same food display unit 10. Accordingly, a food display unit 10 may comprise a mixture of hot and cold food display zones each zone containing a different food type or types. In addition to having the zones heated, cooled or ambient, a food display zone can be set to 'off' and have no form of energy expended in that specific zone. For example, the first zone 12 may contain hot soups or the like, whereas the second zone 14, third zone 16 and fourth zone 18 may contain a number of cooled or chilled items. As the invention relates to a food display unit, or cabinet, which is designed to be used in a retail environment the construction of the unit is such that the end user is able to utilise the cabinet as any other standard food display unit.

The inventors have realised that whilst the ability to maintain the individual food zones at different temperatures provide further flexibility with regards to the display and presentation of food items, the energy consumption associated with such a food display unit 10 may increase over a working day in particular, if a number of the food display zones are to be held at a temperature other than ambient (i.e. heated or cooled). Accordingly, an aspect of the present invention is the ability of the controller 28 to change the energy profile of the individual zones in order to maintain a food display zone at required temperature at a given time to reduce the energy consumption associated with the food display cabinet.

Accordingly, in order to minimise the energy consumption associated with a food display unit 10 according to an aspect of the invention there is provided a system which is able to identify a food type, an optimum temperature associated with the food type, and a duration for which the particular food type will be placed in the food display zone. In retail environments it is known to vary the foodstuffs held in a food display zone over the course of a day. In particular, in environments such as cafes, or sandwich bars, which typically vary the items for sale over the course of a day. For example, some items would only be presented at breakfast time and removed from the food display unit 10 later in the day. Furthermore, when trading is slow (for example towards the end of the trading day) the unit can have zones that are 'off' i.e. no power is supplied to them, and therefore the display unit 10 can display only the quantity of food required for that trading period. This provides further significant power savings as the display is not utilising energy on empty zones. This is in contrast to traditional cabinets which operate at a set temperature in all of the areas within the cabinet regardless of the quantity of product on display (even when a given food display zone is empty) using the same amount of energy.

According to an aspect of the invention, the controller 28 is configured to individually vary the temperatures (if heated, the heat source of either conductive or convective heat from either heater means at 22 or heater means at 24) of each of the food display zones during the course of the day in order to provide an optimal temperature for each zone. Accordingly, each of the food display zones, unlike in the prior art, will vary in temperature and the energy consumption associated with each zone will also vary during the course of the day. By determining an optimal temperature for each zone over the course of a day (the temperature of the zone being variable) the energy consumed by each of the individual food display zones decreases, and accordingly, the overall energy consumption of a food display unit 10 also decreases.

Figure 2:
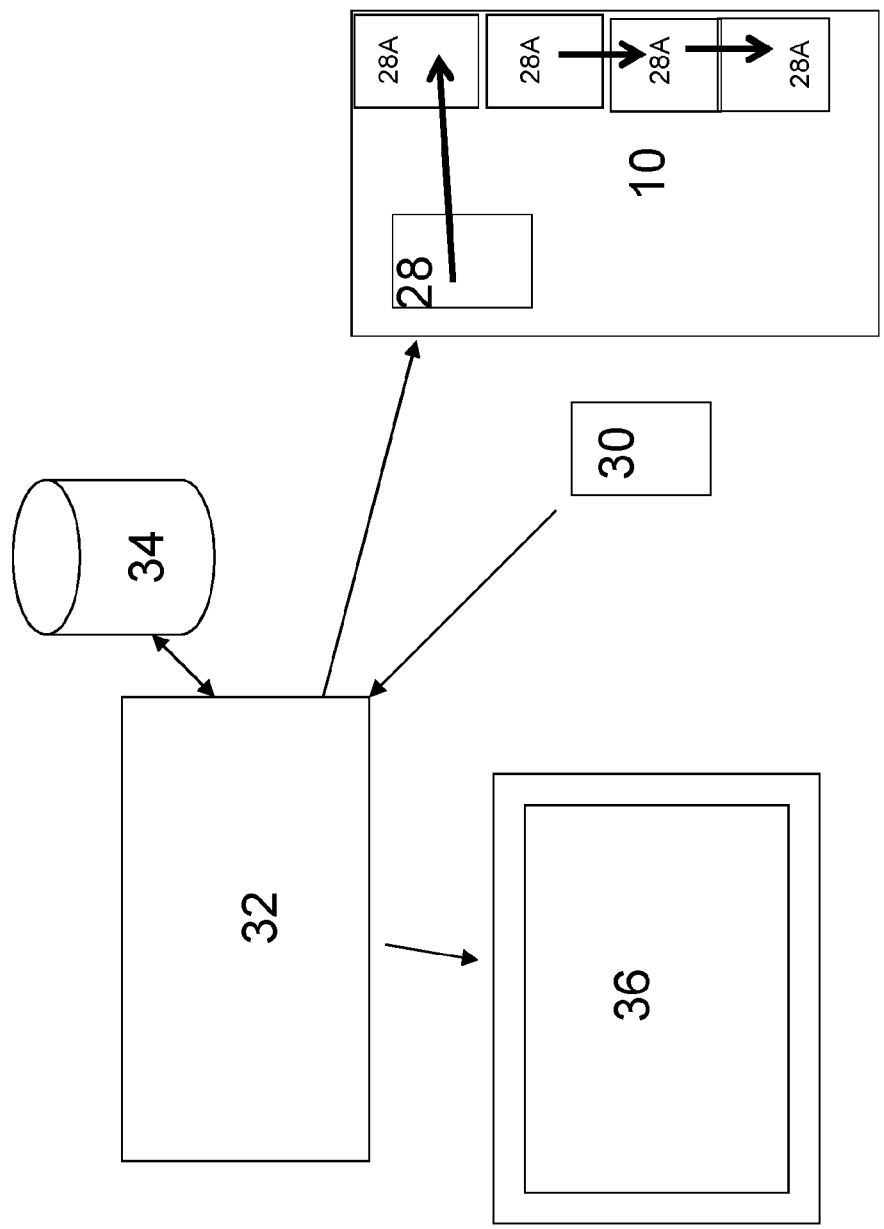
FIG. 2 is a schematic of the system according to the first aspect of the invention.

FIG. 2 shows a schematic representation of an energy saving system according to an aspect of the invention.

There is shown in FIG. 2 the food display cabinet/unit 10. The food display unit 10 is controlled by the controller 28 (which is preferably attached to a slave controller 28A for each individual zone) and is as described with reference to FIG. 1. The system further comprises one or more input devices 30, a computing device 32, a database 34 and a display 36.

The input device 30 in a preferred embodiment is a scanner associated with the food display unit 10. The input device 30 in an embodiment is integrated within each of the food display zones, and in a further embodiment is a handheld device with which a user is able to scan in data associated with the food item, such as barcode, or other form unique identifier. In the preferred embodiments the one or more input devices 30 are in communication with the central computer 32. Such communication is wired or wireless.

In a preferred embodiment the input device 30 is a scanner, though in further embodiments the input device 30 is a keyboard or the like in which a user is able to input identifying information to the computer 32. Preferably, the computer 32 is separate from the food display unit 10 though in further embodiments the computer 32 is integrated within the food display unit 10.

The computer 32 is configured to access information from a database 34. In a preferred embodiment the database is held within the computer 32, though in further embodiments the database is held separate to the computer 32 such as in the cloud. The computer 32 and database 34 communicates using known means. Optionally, the computer 32 is further configured to output to a separate display unit 36.

Typically, in use the food one or more food display cabinets 10 are placed within the "shop floor" environment and the computer 32 is held within a "back office" i.e. away from the retail/shop floor environment.

In use, at the start of the day, an operative will use the input device 30 to input data relating to the food items to be held within each food display zone. As well as inputting information relating to the food type (preferably in the form of a unique identifier), information regarding the food display zone in which the product is to be placed (i.e. the first food display zones 12, second food display zone 14 etc.) is also inputted as well as the length of time said product will be kept in the food display zone. Once inputted, the computer 32 is configured to query the database 34 using the inputted data from which the food type may be identified, in order to determine an optimal temperature profile for the food type. The optimal temperature profile depends on the food type as well as any relevant Food Safety Legislation that must be complied with regarding the display of food items. The temperature profile and optimum display time are preferably held in the database 34 which is queried by the computer 32 and assigned to a specific zone within the unit 10. The initial recognition of the unique record or 'recipe' for the food stuff that is either chosen from a stored list in database 34 or recognised by the device 30 or other means of identification and the 'recipe' for that unique identification is then made available from the database for assignation to a zone. The computer 32 is further configured to transmit information to the controller 28 in order to maintain the temperature of the individual food display zones at the correct temperature via the slave controller 28A which is assigned to that specific zone.

In a further embodiment, one or more of the information regarding the food display zone, time the food item is placed in a zone, and length of time a food item is to be held in a particular zone is held in the database 34 and retrieved once the information identifying the food item has been inputted at the input device 30.

This process is described in detail with reference to FIG. 3.

Figure 3:
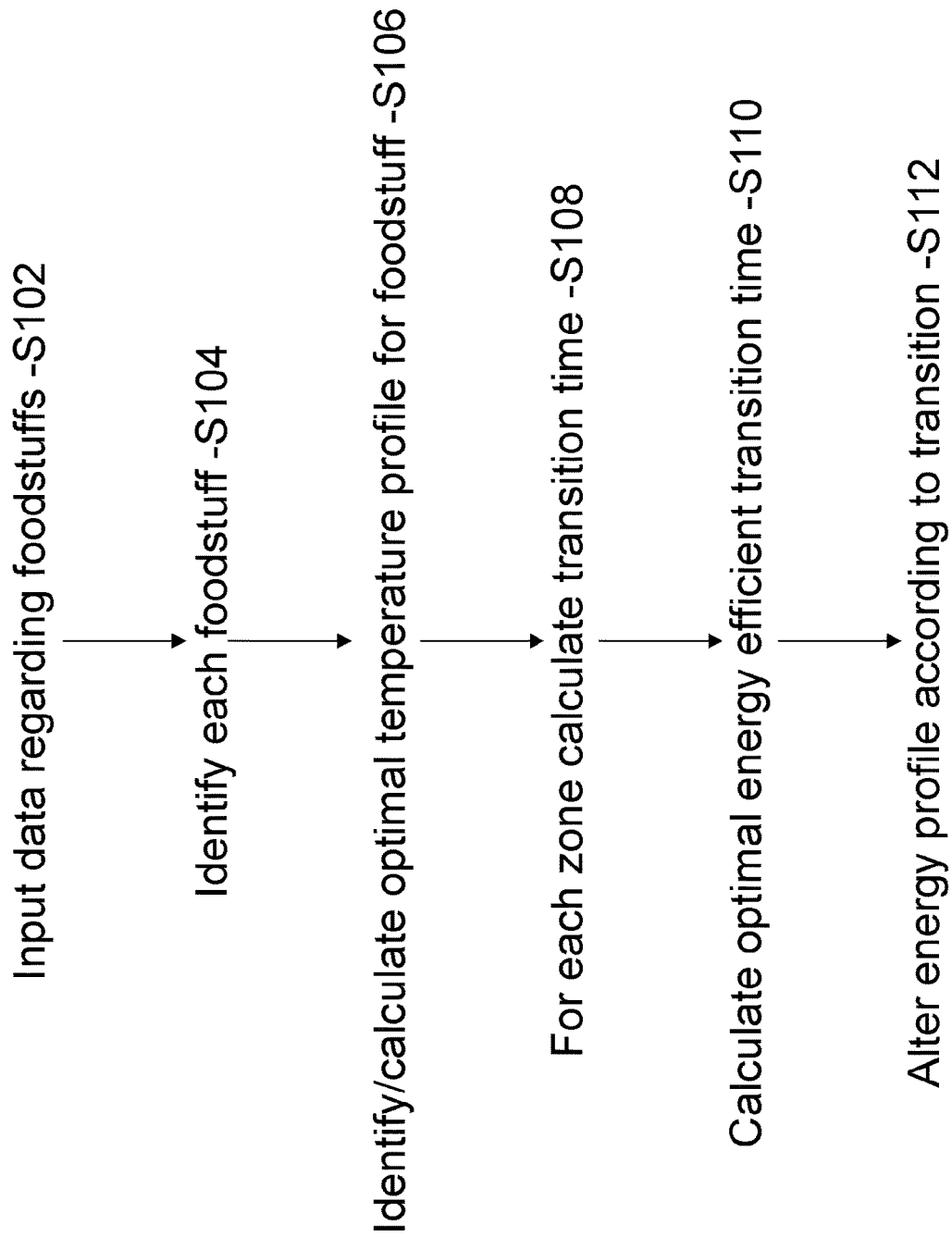
FIG. 3 is a flow chart of the process according to an aspect of the invention.

FIG. 3 shows a flow chart of the process of determining the optimal energy profile over a period of time, such as a working day for a food display cabinet/unit 10. The ability to adapt the energy usage profile of the food display unit over the course of a day is found to result in a significant decrease in the energy consumption of the food display unit, especially when compared to the standard profile which would involve running an entire food display unit at the same temperature throughout the course of the day.

It is known in the retail industry that the position of placement of an item within a food display cabinet 10 will affect the subsequent visibility and sale of the item to consumers. For example, it is known that the second zone 14, which is at approximately eye level, is typically the zone in which the most number of items are sold. Accordingly, when new items are introduced (for example a new product or a new range) then a retailer may typically place such an item in the second zone 14 in order to promote said item.

The process of optimising the energy profile is now described with reference to FIG. 3.

At step S102, the user inputs data regarding the food item or items to be placed within a food display zone of the food display cabinet 10. One or more different items may be placed within an individual display zone (i.e. first zone 12, second zone 14, third zone 16, fourth zone 18) though each item must be placed with items which are to be kept, and displayed, at the same temperature. As described previously with reference to FIG. 2, the data regarding the food items is inputted using the input device 30.

At step S104 each item is identified using the data from the input device 30. In an embodiment, the unique identifier identifying the foodstuff will also identify one or more of a food display zone in which the item is to be placed, a period of time for which the item is to be placed within a food display zone, and the time in which the item is to be placed within a food display zone. In further embodiments, further data may be inputted via the input device 30 which one or more of identify the food display zone and the period of time in which the item is placed within said food display zone. In a further embodiment, the information regarding the particular zone and length of time the item is held within said zone is already held in the database 34, and accordingly, the scanning of the item using the user input device 30 retrieves such information.

Once the item has been identified, along with the food display zone and the period of time said item is to be placed in the zone, optimal temperature profile is identified/calculated for each of the food display zones at step S106. The optimal temperature profile for a foodstuff depends on the particular foodstuff, and the relevant safety standards associated with the product. For example, items such as sandwiches are required to be held at a temperature of between 4° C. and 8° C.

At step S108 the system determines for each of the individual food display zones, any transition times which are anticipated during the day. For example, a first food display zone 12 may contain and display warm pastry products between the hours 7.00 am and 11.00 am, which are to be held at a temperature of 50° C. (i.e. in the example between the hours of 7.00 am to 11.00 am warm pastries are offered for sale from food display zone 12). After 11.00 am, the first food display zone 12 may be stocked with sandwiches which are to be held at a temperature of 4° C. to 8° C. (i.e. in the above example, after 11.00 am warm pastry products are no longer displayed in the first food display zone 12, and are replaced by sandwiches). Subsequently, after 4 pm the first food display zone 12 is stocked with crisps which are kept at ambient temperature. Accordingly, the products displayed and offered for sale vary over the course of the day, and the temperature of the first food display zone 12 would change over the course of the day to accommodate the display of different products. The temperatures and times that an individual food display zone changes over time varies according to the individual requirements of the environment in which the system is placed.

At step S108 for all food display zones during the desired time period (e.g. a day) each transition time (i.e. when the time at which the temperature of the individual zone is to change) is determined.

At step S110, the system calculates an optimum efficient energy transition profile for each transition time determined at step S108. The items which remain in a given food display zone at the end of the shelf life time of the item (for example the pastry products which remain unsold at 11.00 am in the above example) are removed from the food display zone and are typically thrown away or placed in a different zone. In order to ensure maximum effectiveness of the food display cabinet/unit 10 in a preferred embodiment the individual food display zones are at the required temperature at the time the new item is placed in the given food display zone. Illustratively, in the above example, the first food display zone 12 would be at the required temperature for sandwiches (i.e. between 4° C. to 8° C.) at 11.00 am. At step S110, the optimum energy transition time profile is therefore determined using the calculated transition time. The calculation of the transition time is dependent on the difference in temperatures, the strength of the temperature regulating device 24, as well as the maximum energy efficiency that the system wishes to attain.

Preferably the transition Time Calculation is as below:

$$\Delta Tr = (Ht - Lt)/3$$

where $\Delta Tr$ is the transition time in minutes

Ht is the highest temperature for the zone in Degrees C.

Lt is the lowest temperature for the zone in Degrees C.

In further embodiments other methods of determining the transition time may be used.

Once the energy transition profiles have been determined, the optimal energy profile for the period of time (e.g. a day) is calculated at step S112 and inputted to the controller 28. The controller 28 varies the temperature of the individual food display zones according to the calculated optimum energy profile over the course of the day. As each food display zone further comprises a temperature sensor 26, the controller 28 is able to maintain the temperatures as required during the course of the day.

Figure 4:
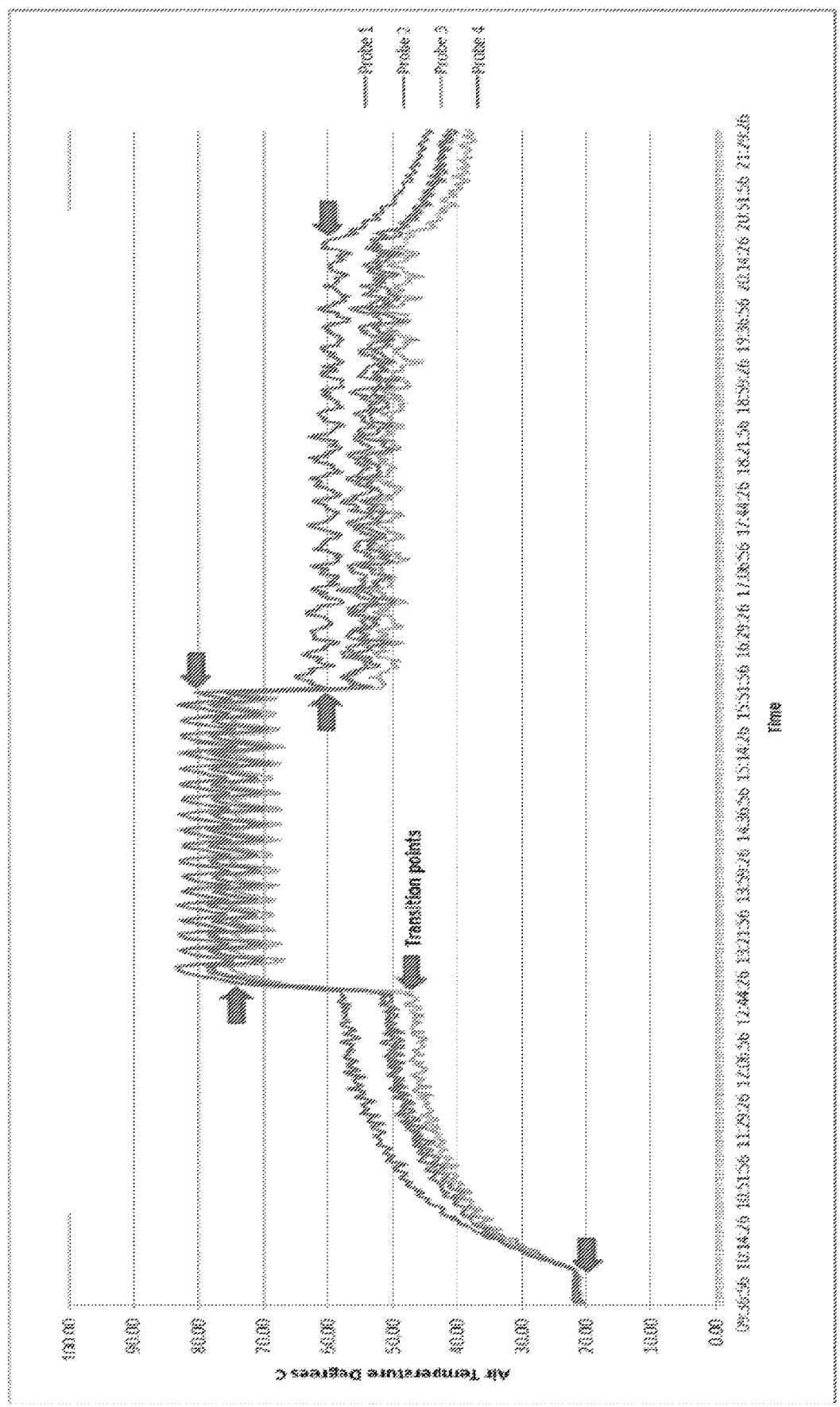
FIG. 4 is experimental data illustrating an example of the invention.

FIG. 4 shows an example of a typical temperature profile for a first food display zone across the course of a day. FIG. 4 shows how the temperature varies across the course of a day.

In the morning, at approximately the 10:15 the unit is switched on and the temperature is increased to operating temperature of approximately 50° C. at 11:30. Products such as warm soup may be held at this temperature. Between 11:30 and the transition point at 12:45 the temperature is kept approximately constant at 50° C. The variations shown are typical for food display units where the temperature regulating device 24 (in this instance conduction heating via the base heater at 22) switches on and off in order to maintain the temperature of the food display zone within the desired range. From the information inputted (i.e. at step S102 of FIG. 3) it is determined at approximately 13:00 hot food will be placed in the food display zone. Accordingly, between the first transition point (12:45) and 13:00 the temperature of the zone is increased.

The temperature is kept at approximately constant temperature (here ~75° C.) until the second transition time. From the information inputted at step S102 it is determined that at 16:00 foodstuffs which are to be held at approximately ~55° C. are to be placed in the food display zone. Accordingly at 15:50 the temperature of the food display zone is decreased so that it is at the optimum temperature at 16:00.

Tests performed by the inventors have shown that the methodology of the claimed invention may result in significant energy savings. Tests performed over the duration of a typical working day (12 hours) using a varying temperature plan as per the above described process reduces the typical energy consumption of a unit by approximately 25% for a unit that would typically run at 75° C. (test show a reduction in energy consumption from approximately 3.08 kW/h to 2.37 kW/h).

As well as reducing the energy consumption of an individual food display unit 10, the system has further benefits in adding stock management. As the system is designed to ensure that the temperature of the food zones is optimised for a product at a given time (in particular with reference to the transition between temperatures) this information, in an embodiment is also by the computer 32 to manage stock.

If the foodstuff in a particular zone is known to have a limited shelf life (e.g. a couple of hours) and that the product is approaching the end of the shelf life the computer is configured to display messages, via the display 36, to inform a user of the unit (e.g. a member of staff) who may act accordingly. For example, the message may be to reduce the price of a product.

Furthermore, the computer 32 is configured to display messages via the display 36 regarding a transition. This would allow members of staff to prepare for the switching of stock. For example, if a foodstuff to be placed in the first food zone 12 is to be prepared and cooked, said preparation and cooking taking 35 minutes, then at an appropriate time messages are displayed to inform the staff to commence preparing and cooking the foodstuff. In a further embodiment, separately or in conjunction with the display 36 an audible alarm may be used.

Therefore the system may aide in providing a more efficient transition between foodstuffs for a given food display zone.

The invention claimed is:

1. An open fronted food display cabinet having a plurality of open fronted food display zones, wherein each open fronted food display zone is designed and configured to display food items to consumers to purchase the food items, further wherein a temperature of each open fronted food display zone is independently controllable by a corresponding temperature regulating device operably coupled to the food display zone, the open fronted food display cabinet having a controller to control the temperature regulating devices to control the temperature of each of the open fronted food display zones, wherein the open fronted food display zones do not cook the food displayed in the open fronted food display zones, the controller configured to:
  receive indicia of a plurality of types of food items to be displayed in the open fronted food display zones;
  receive information regarding the corresponding ones of the food display zones in which each type of food item is to be placed;
  receive or identify placement times at which each type of food item will be placed in the cabinet for display in the open fronted food display zones;
  receive or identify an item temperature profile associated with each type of food item;
  determine a food display zone temperature profile for each of the plurality of food display zones according to the types of food items to be placed in each of the food display zones and the identified times and item temperature profiles, wherein at least one of the food display zone temperature profiles includes a first placement time for a first food item and a second placement time for a second food item in the same day; and
  independently control the temperature of each of the plurality of open fronted food display zones, using the temperature regulating devices, according to the determined food display zone temperature profiles so that the temperature of each of the plurality of open fronted food display zones is automatically controlled at the identified temperature for a given food item at the time of day the food item is displayed in the corresponding open fronted food display zone.

2. The food display cabinet of claim 1 further comprising input means to input the indicia regarding the food item to be placed in a food display zone.

3. The food display cabinet of claim 1 further comprising a database, wherein said database comprises temperature profiles associated with a plurality of food items, and the controller configured to query the database for information regarding a given food item.

4. The food display cabinet of claim 1, wherein the receive or identify placement times step includes:
  identifying or receiving a first one of the placement times when a first one of the plurality of types of food items having a first temperature profile will be placed in a first one of the display zones;
  identifying or receiving a first time period for a duration of time that items of the first type of food item will be displayed;
  identifying or receiving a second one of the placement times for a time of day after the first placement time and during the same day when a second one of the plurality of types of food items having a second item temperature profile that is different from the first temperature profile will be placed in the first one of the display zones;
  identifying or receiving a second time period for a duration of time that the items of the second type of food item will be displayed; and
  wherein the determine a food display zone temperature profile step includes determining, before the first placement time, a temperature profile for the first one of the display zones that specifies a temperature versus time for a time period that includes the first and second time periods.

5. The food display cabinet of claim 4 wherein the controller is configured to determine a time duration before the second placement time to begin transitioning the temperature of the first one of the display zones from the first temperature profile to the second temperature profile, wherein the time duration is determined according to:

$$\Delta Tr = (Ht - Lt)/X$$

where $\Delta Tr$ is the time duration in minutes, $Ht$ is the highest temperature for the zone in Degrees C., $Lt$ is the lowest temperature for the zone in Degrees C., and $X$ is a proportionality constant equal to 3 Degrees C./min.

6. The food display cabinet of claim 4 wherein the controller is further configured to determine a transition temperature profile that specifies a temperature during a time period between the end of the first time period and the second placement time.

7. The food display cabinet of claim 6, wherein the determining the transition temperature profile includes utilizing a rate of change of the temperature of the display zone to determine a transition time that results in a temperature of the display zone being within the first temperature profile at the transition time and within the second temperature profile at the second placement time.

8. The food display cabinet of claim 7, wherein the transition time is determined by the controller in response to receiving a user input of the first time and the second time.

9. The food display cabinet of claim 1 wherein the controller is attached or integrated within the cabinet.

10. The food display cabinet of claim 1 further comprising one or more lights in one or more of the food display zones.

11. The food display cabinet of claim 10 wherein the food display zone temperature profile includes a period of time for an item temperature profile that specifies an ambient temperature, wherein the controller is configured to automatically and selectively disable power to one or more of the temperature regulating devices according to the food display zone temperature profile and time of day and power is only supplied to the one or more lights in the corresponding food display zones in a "lights only" mode.

12. The food display cabinet of claim 10 wherein the controller is configured to selectively disable power to the temperature regulating devices and/or lights.

13. The food display cabinet of claim 1 wherein the cabinet further comprises communication means to communicate with an external computing means.

14. A food display system comprising the food display cabinet and external computing means of claim 13.

15. The food display system of claim 14 wherein the computing means comprises a database which stores data with information relating to the temperature profiles associated with the plurality of food items.

16. A food display system comprising one or more food display cabinets of claim 1 and a computer configured to control the one or more food display cabinets.

17. The food display system of claim 16 further comprising a display means configured to display information regarding transition times at which the temperatures of the food display zones is to change.

18. The food display system of claim 17, wherein the display means is configured to display the information regarding the transition times at a display time, wherein a duration of time between the display time and the transition time is greater than or equal to a cooking time duration for cooking the food items prior to placing the food items in the food display cabinet.

19. The food display cabinet of claim 1, further comprising at least one heating device and at least one cooling device, the temperature regulating devices operably connected to the at least one heating device and the at least one cooling device for controlling the temperatures of the plurality of open fronted food display zones.

20. The food display cabinet of claim 19, wherein the at least one cooling device includes at least one of a fan and a refrigerating element.

21. The food display cabinet of claim 1, wherein the identify an item temperature profile step includes:
- identifying a first temperature profile for a first food item to be placed in a first one of the display zones and displayed for a first time duration; and
- identifying a second temperature profile for a second food item to be placed in the first one of the display zones for a second time duration immediately after the first time duration.

22. The food display cabinet of claim 21, wherein one of the first and second temperature profiles is an above-ambient temperature profile for maintaining a temperature of a heated food item at an above-ambient temperature and the other one of the first and second temperature profiles is a below-ambient temperature profile for maintaining a temperature of a refrigerated food item at a below-ambient temperature, the food display zone temperature profile specifying a time duration for each of the first and second temperature profiles and a transition time for transitioning therebetween.

23. The food display cabinet of claim 1, wherein the temperature regulating device is configured to distribute heated air as an air curtain over a front aperture of a corresponding one of the food display zones.

24. The food display cabinet of claim 1, wherein the open fronted food display cabinet is designed and configured to display the food items to customers in a café or supermarket for the customers to purchase.

25. An open fronted food display cabinet having a plurality of food display zones, wherein each food display zone includes a temperature regulating device and is configurable to be held at the same or different temperatures, the food display cabinet having a controller to control the temperature of each of the food display zones,
the controller configured to:
- receive indicia of a food item to be placed in a first food display zone;
- identify a time the food item is to be placed in the first food display zone;
- identify a temperature profile associated with the food item; and
- vary the temperature of the first food display zone, using the temperature regulating device, so that the first food display zone is at the identified temperature for the food item at the time the food item is placed in the first food display zone.

26. The food display cabinet of claim 25, further comprising at least one heating device and at least one cooling device, the temperature regulating devices operably connected to the at least one heating device and the at least one cooling device for controlling the temperatures of the plurality of food display zones.

27. The food display cabinet of claim 26, wherein the at least one cooling device includes a vapour evaporation device.

28. The food display cabinet of claim 25, wherein the temperature regulating device is configured to distribute heated air as an air curtain over a front aperture of a corresponding one of the food display zones.

29. The food display cabinet of claim 25:
- wherein the receive indicia step includes receiving indicia for a plurality of different types of food items to be placed in the first food display zone during a given day;
- wherein the identify a time step includes identifying a plurality of times that each of the corresponding plurality of different types of food items will be placed in the first food display zone;
- wherein the identify a temperature profile step includes identifying a temperature profile for each of the plurality of food items; and
- wherein the vary the temperature step includes varying the temperature of the first food display zone so that the temperature transitions from one of the temperature profiles to another one of the temperature profiles so that the first food display zone is within the temperature profile of a given one of the plurality of food items at the time the food item is placed in the first food display zone.

30. The food display cabinet of claim 29, further comprising maintaining the temperature of the first food display zone within a given one of the temperature profiles until the step of varying the temperature to another one of the temperature profiles.

31. The food display cabinet of claim 29, further comprising determining a transition time for initiating a transition from one of the temperature profiles to another one of the temperature profiles, wherein determining a transition time includes utilizing a rate of change of the temperature of the display zone so that the temperature of the first food display zone is within a given one of the temperature profiles when a corresponding food item is to be placed in the first food display zone.

* * * * *